(12) United States Patent
Keyes et al.

(10) Patent No.: US 6,475,093 B1
(45) Date of Patent: Nov. 5, 2002

(54) PROTECTIVE COVER ASSEMBLY FOR A SLIP YOKE IN A VEHICLE DRIVE TRAIN ASSEMBLY

(75) Inventors: Terry M. Keyes, Jordan Station (CA); Kellie L. Stevens, Ypsilanti, MI (US); Brian N. Wiskur, Overland Park, KS (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/725,648

(22) Filed: Nov. 29, 2000

(51) Int. Cl.⁷ .................................................. F16L 57/00
(52) U.S. Cl. ...................... 464/134; 464/185; 138/96 T; 138/96 R; 138/110
(58) Field of Search ........................... 138/96 T, 96 R, 138/110; 464/134, 170, 185, 905

(56) References Cited

U.S. PATENT DOCUMENTS

| | | | |
|---|---|---|---|
| 370,784 A | 10/1887 | Hayworth | |
| 3,386,312 A | * 6/1968 | Weasler | 464/170 |
| 3,797,328 A | * 3/1974 | Quirk | 74/609 |
| 4,425,945 A | 1/1984 | McDonald | |
| 4,518,017 A | 5/1985 | Hennon et al. | |
| 4,663,984 A | * 5/1987 | Taylor | 464/175 |
| 4,945,745 A | 8/1990 | Bathory et al. | |
| 5,048,571 A | 9/1991 | Ellis | |
| 5,676,600 A | * 10/1997 | Campbell | 464/170 |
| 6,183,370 B1 | * 2/2001 | Lim | 464/134 |

\* cited by examiner

*Primary Examiner*—Lynne H. Browne
*Assistant Examiner*—Ken Thompson
(74) *Attorney, Agent, or Firm*—MacMillan, Sobanski & Todd, LLC

(57) ABSTRACT

A two piece cover assembly for protectively covering an end of a component, such as a slip yoke, in a vehicle drive train assembly includes a tubular piece and a cap piece. The tubular piece is hollow and is adapted to fit over and frictionally engage an end portion of the component. A portion of the tubular piece may be deformed to provide such frictional engagement. The cap piece is removably attached to the tubular piece by cooperating retaining structures provided thereon.

20 Claims, 4 Drawing Sheets

PROTECTIVE COVER ASSEMBLY FOR A SLIP YOKE IN A VEHICLE DRIVE TRAIN ASSEMBLY

BACKGROUND OF THE INVENTION

This invention relates in general to drive train assemblies for transferring rotational power from an engine to an axle assembly in a vehicle. In particular, this invention relates to a cover assembly for protecting the surfaces of a slip yoke during manufacturing and assembly of such a vehicle drive train assembly.

In most land vehicles in use today, a drive train assembly is provided for transmitting rotational power from an output shaft of an engine/transmission assembly to an input shaft of an axle assembly so as to rotatably drive one or more wheels of the vehicle. To accomplish this, a typical vehicular drive train assembly includes a hollow cylindrical driveshaft tube. A first universal joint is connected between the output shaft of the engine/transmission assembly and a first end of the driveshaft tube, while a second universal joint is connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of angular misalignment between the rotational axes of these three shafts.

Not only must the drive train assembly accommodate a limited amount of angular misalignment between the engine/transmission assembly and the axle assembly, but it must also typically accommodate a limited amount of axial movement therebetween. A small amount of such relative axial movement frequently occurs when the vehicle is operated. To address this, it is known to provide one or more slip yoke assemblies in the drive train assembly. Slip yoke assemblies have a pair of splined members which provide a rotational driving connection between the components of the drive train assembly, while permitting a limited amount of axial misalignment therebetween. A typical slip yoke assembly includes a slip yoke having a yoke portion and a cylindrical end portion. The end portion is typically hollow and includes a plurality of internal splines. The internal splines mate with external splines formed on a shaft, such as may be secured to an end of a driveshaft tube in the drive train assembly.

As is well known in the art, most slip yoke assemblies are provided with one or more seals to prevent the entry of dirt, water, and other contaminants into the region where the splined members engage one another. Such contaminants can adversely affect the operation of the slip yoke assembly and cause premature failure thereof. Typically, such a seal includes a flexible lip portion that engages the outer cylindrical surface of the end portion of the slip yoke to prevent contaminants from entering into the inner splined region where the slip yoke engages with a mating splined component of the drive train assembly. To insure a reliable seal, therefore, it is usually important for the outer cylindrical surface of the end portion of the slip yoke to be generally smooth and free from relatively large surface irregularities, such as nicks and dents.

To accomplish this, the outer cylindrical surface of the end portion of the slip yoke is usually machined precisely during manufacture to achieve the desired smooth shape. Thereafter, it has been found to be desirable to protect this precisely machined surface during the subsequent processing and assembly steps involved in manufacture of the drive train assembly. In the past, to protect this precisely machined surface, it is known to use a one piece, cup-shaped cover that slips over and protectively covers the end portion of the slip yoke, including the outer cylindrical surface thereof. The cover is generally tubular in shape, having a closed end and an opened end. The cover is installed on the yoke by inserting the end portion of the slip yoke through the opened end of the cover. Thus, the cover protects the outer surface of the end portion of the slip yoke. The closed end of the cover extends over the open splined end of the slip yoke to prevent contaminants from entering therein.

Although this type of cover has functioned satisfactory in the past, it is sometimes desirable to obtain access to the splined interior of the end portion of the slip yoke during the various processing and assembly steps involved in manufacture of the drive train assembly while continuing to protectively cover the precisely machined outer surface of the slip yoke. For example, it may be desirable to insert a tool fixture into the internal splined region of the end portion of the slip yoke to hold the slip yoke in position during a machining or assembly procedure. In the past, the entire cover was simply removed (and possibly discarded) at this intermediate step of assembly, when access to the interior splined portion of the slip yoke was required. However, removal of the cover also undesirably exposes the precisely machined outer surface of the slip yoke to possible contamination or surface damage. Thus, it would be desirable to provide an improved protective cover for a slip yoke or other component that addresses this problem.

SUMMARY OF THE INVENTION

This invention relates to a two piece cover assembly for protecting a surface of a component, such as a slip yoke in a vehicle drive train assembly, during manufacturing and/or assembly. The cover assembly includes a tubular piece and a cap piece. The tubular piece has an inner surface that is adapted to fit over a hollow end portion of the slip yoke. The cap piece is removably attached to an end of the tubular piece such that the cap piece covers the splined inner surface of the slip yoke. In a preferred embodiment, the tubular piece and the cap piece each have retaining structures provided thereon that cooperate to removably retain the tubular piece and the cap piece together. The retaining structures can include mating external and internal ridges formed on the tubular piece and the cap piece, respectively. Alternatively, the tubular piece can include a circumferential groove formed therein, and the cap piece can include an annular ridge that extends inwardly into the groove to removably retain the tubular piece and the cap piece together.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
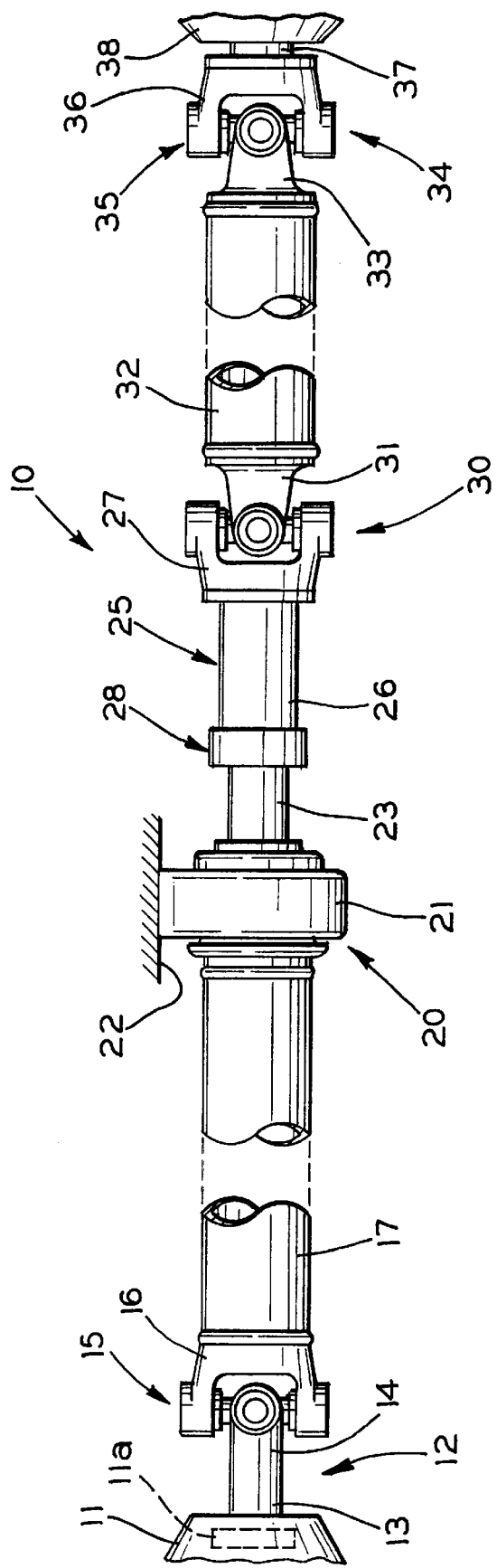
FIG. 1 is a side elevational view of a conventional vehicle drive train assembly including a plurality of slip yoke assemblies.

Referring now to the drawings, there is illustrated in FIG. 1 a drive train assembly, indicated generally at 10, for a vehicle that is adapted to transmit rotational power from an engine/transmission assembly 11 to a plurality of driven wheels (not shown). The illustrated drive train assembly 10 is intended merely to illustrate one environment in which this invention may be used. Thus, the scope of this invention is not intended to be limited for use with the specific structure for the vehicle drive train assembly 10 illustrated in FIG. 1 or to vehicle drive train assemblies in general. On the contrary, as will become apparent below, this invention may be used to protect a surface of any desired component.

The engine/transmission assembly 11 is conventional in the art and includes an externally splined output shaft (not shown) that is connected to a first slip yoke, indicated generally at 12. The first slip yoke 12 is conventional in the art and includes an end portion 13 having a smooth cylindrical outer surface and an internally splined inner surface 13a (see FIGS. 2 and 3). The internally splined inner surface of the end portion 13 of the first slip yoke 12 engages the externally splined output shaft of the engine/transmission assembly 11 in a known manner. As a result, the first slip yoke 12 is rotatably driven by the output shaft of the engine/transmission assembly 11, but is free to move axially relative thereto to a limited extent.

An annular seal 11a may be provided within or adjacent to the end of the engine/transmission assembly 11. The end portion 13 of the first slip yoke 12 extends through the annular seal 11a. In a known manner, the seal 11a engages and seals against the smooth outer cylindrical surface of the end portion 13 of the first slip yoke 12 to prevent dirt, water, and other contaminants from entering into the engine/transmission assembly 11. The seal 11a is conventional in the art and can be formed having any desired structure. To insure a reliable seal, however, it is usually important for the outer cylindrical surface of the end portion 13 of the first slip yoke 12 to be generally smooth and free from relatively large surface irregularities, such as nicks and dents. If desired, the seal 11a may be retained in an annular ridge (not shown) formed in the engine/transmission assembly 11.

The first slip yoke 12 further includes a yoke portion 14 that forms one part of a first universal joint assembly, indicated generally at 15. The first universal joint assembly 15 is also conventional in the art and includes a tube yoke 16 that is connected to the yoke portion 14 of the first slip yoke 12 by a cross in a known manner. The tube yoke 16 is secured, such as by welding, to a first end of a first driveshaft section 17 for rotation therewith. The first universal joint assembly 15 thus provides a rotational driving connection between the output shaft of the engine/transmission assembly 11 and the first driveshaft section 17, while permitting a limited amount of axial misalignment therebetween.

The first driveshaft section 17 extends through and is supported for rotation by a center bearing assembly, indicated generally at 20. The center bearing assembly 20 is conventional in the art and includes a rigid frame or bracket 21 that is secured to a support surface 22, such as a portion of a frame, chassis, or body of the vehicle. The first driveshaft section 17 has a second end 23 that, in the illustrated embodiment, is reduced in diameter relative to the first end of the first driveshaft section 17, although such is not necessary. The reduced diameter end 23 can be formed as a separate structure that is welded onto the larger diameter first end of the first drive shaft section 17. In any event, a portion of the outer surface of the reduced diameter second end 23 of the first driveshaft section 17 is formed having a plurality of external splines (not shown).

A second slip yoke, indicated generally at 25, is connected, such as by welding, to the reduced diameter second end 23 of the first driveshaft section 17 for rotation therewith. The second slip yoke 25 is conventional in the art and includes an end portion 26 having an internally splined inner surface (not shown). The internally splined inner surface of the end portion 26 of the second slip yoke 25 engages the externally splined portion of the second end 23 of the first driveshaft section 17 in a known manner. As a result, the second slip yoke 25 is rotatably driven by the first driveshaft section 17, but is free to move axially relative thereto to a limited extent.

An annular seal, indicated generally at 28, may be mounted on the end portion 26 of the second slip yoke 25. The reduced diameter second end 23 of the first driveshaft section 17 extends through the annular seal 28. In a known manner, the annular seal 28 engages and seals against the smooth outer cylindrical surface of the reduced diameter second end 23 of the first driveshaft section 17 to prevent dirt, water, and other contaminants from entering into the region of the cooperating splines. The seal 28 is conventional in the art and can be formed having any desired structure.

The second slip yoke 25 further includes a yoke portion 27 that forms one part of a second universal joint assembly, indicated generally at 30. The second universal joint assembly 30 is also conventional in the art and includes a tube yoke 31 that is connected to the yoke portion 27 of the second slip yoke 25 by a cross in a known manner. The tube yoke 31 is secured, such as by welding, to a first end of a second driveshaft section 32 for rotation therewith. The second universal joint assembly 30 thus provides a rotational driving connection between the second end 23 of the first driveshaft section 17 and the first end of the second driveshaft section 32, while permitting a limited amount of axial misalignment therebetween.

The second end of the second driveshaft section 32 is secured, such as by welding to a tube yoke 33 that forms one part of a third universal joint assembly, indicated generally at 34. The third universal joint assembly 34 is also conventional in the art and includes a third slip yoke, indicated generally at 35. The third slip yoke 35 is conventional in the art and includes a yoke portion 36 that is connected to the tube yoke 33 by a cross in a known manner. The third slip yoke 35 further includes an end portion 37 having a smooth cylindrical outer surface and an internally splined inner surface (not shown). The internally splined inner surface of the end portion 37 of the third slip yoke 12 engages an externally splined input shaft of a conventional axle assembly 38 that is connected to the plurality of driven wheels of the vehicle in a known manner. As a result, the input shaft of the axle assembly 38 is rotatably driven by the second driveshaft section 32, but is free to move axially relative thereto to a limited extent.

An annular seal (not shown) may be provided within or adjacent to the end of the axle assembly 38. The annular seal may be similar in structure and operation to the annular seal 11a described above. The end portion 37 of the third slip yoke 35 extends through the annular seal. In a known manner, the annular seal engages and seals against the smooth outer cylindrical surface of the end portion 37 of the third slip yoke 35 to prevent dirt, water, and other contaminants from entering into the axle assembly 38. The seal is conventional in the art and can be formed having any desired structure. To insure a reliable seal, however, it is usually important for the outer cylindrical surface of the end portion 37 of the third slip yoke 35 to be generally smooth and free from relatively large surface irregularities, such as nicks and dents. If desired, the seal may be retained in an annular ridge (not shown) formed in the axle assembly 38.

Figure 2:
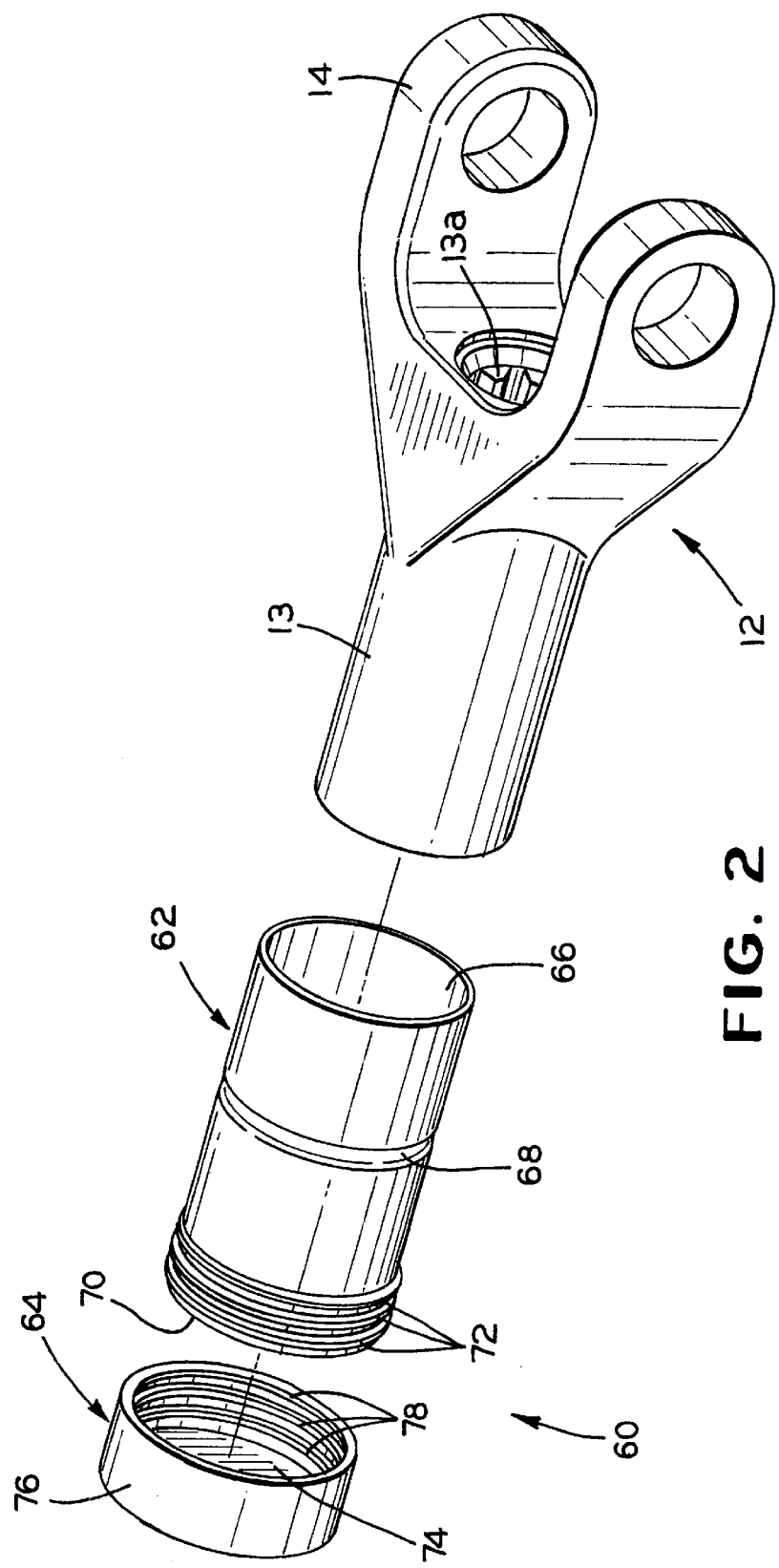
FIG. 2 is an exploded perspective view of one of the slip yokes illustrated in FIG. 1, together with a first embodiment of a cover assembly for covering and protecting the precisely machined outer surface of the slip yoke in accordance with this invention.
Figure 3:
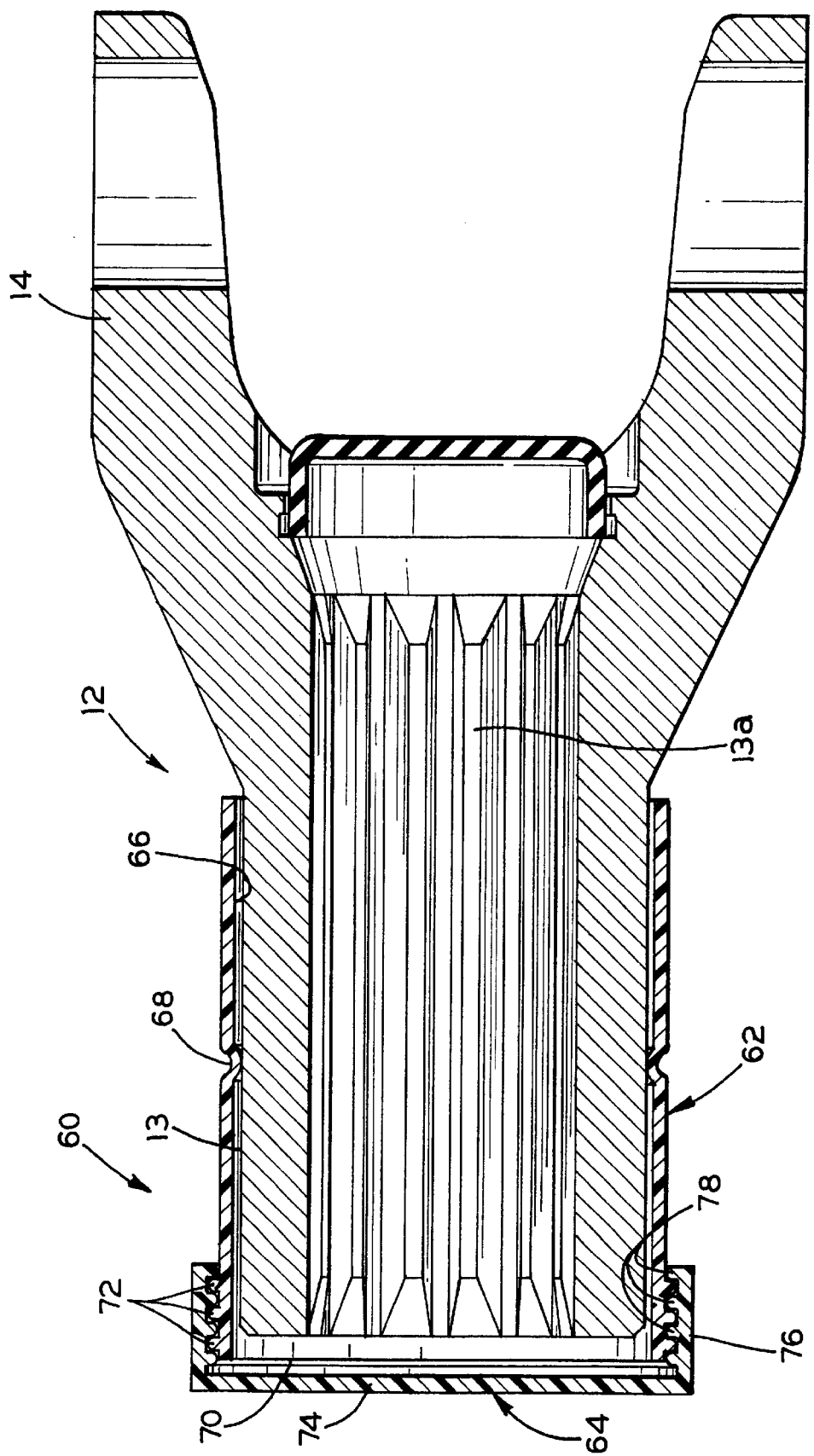
FIG. 3 is a sectional view of the cover assembly and slip yoke illustrated in FIG. 2 showing the tubular piece and the cap piece of the cover assembly installed on the end portion of the slip yoke.

Referring now to FIGS. 2 and 3, the first slip yoke 12 illustrated in FIG. 1 is shown together with a first embodiment of a cover assembly, indicated generally at 60, for covering and protecting the outer cylindrical surface of the end portion 13 in accordance with this invention. In the manner described in detail below, the cover assembly 60 is sized to fit telescopically over the end portion 13 of the slip yoke 12 to protectively cover the outer cylindrical surface thereof and to prevent contaminants from entering into the interior thereof. It will be appreciated that the cover assembly 60 of this invention may be used to cover any of the slip yokes 12, 25, or 35 illustrated in FIG. 1 or any other component.

The first embodiment of the cover assembly 60 is formed from two separate pieces, such as a tubular piece, indicated generally at 62, and a cap piece, indicated generally at 64, as illustrated in FIGS. 2 and 3. The tubular piece 62 is generally hollow and cylindrical in shape, defining an inner generally cylindrical surface 66 provided therein. The inner surface 66 of the tubular piece 62 is preferably complementary in shape to the end portion 13 of the slip yoke 12, although such is not required. The inner diameter defined by the inner surface 66 of the tubular piece 62 is preferably only slightly larger than the outer diameter defined by the end portion 13 of the slip yoke 12. If desired, some or all of the inner surface 66 of the tubular piece 62 may be sized to frictionally engage the outer cylindrical surface of the end portion 13 of the slip yoke 12. For example, as shown in FIGS. 2 and 3, the tubular piece 62 may be formed having an interior reduced diameter portion, such as shown at 68, that is sized to frictionally engage a portion of the outer cylindrical surface of the end portion 13 of the slip yoke 12. In the illustrated embodiment, the reduced diameter portion 68 is provided by deforming an annular recess about a central portion of the tubular piece 62. The magnitude of this frictional engagement between the tubular piece 62 and the end portion 13 of the slip yoke 12 is preferably sufficiently small such that the tubular piece 62 can be installed upon and removed from the end portion 13 manually without the use of tools, yet is sufficiently large so as to reliably retain the tubular piece 62 on the end portion 13 of the slip yoke 12 during normal handling. The tubular piece 62 may be formed having any desired axial length, but preferably extends axially at least as long as the end portion 13 of the slip yoke 12 such that the entire outer cylindrical surface thereof is protectively covered.

The tubular piece 62 is preferably formed having an end portion 70 that is formed having or is otherwise provided with one or more structures for retaining the cap piece 64 thereon. In the illustrated embodiment, such retaining structures are embodied as a plurality of annular external ridges 72 that are formed in or on the end portion 70 of the tubular piece 62. Each of the illustrated external ridges 72 extends radially outwardly from and circumferentially about the outer cylindrical surface of the end portion 13 of the first slip yoke 12. It will be appreciated, however, that such ridges 72 need not extend completely or continuously about the outer cylindrical surface of the end portion 13 of the slip yoke 12. Furthermore, these or similar retaining structures 72 may be provided at any other desired location on the tubular piece 62.

The cap piece 64 is generally cup-shaped, including a closed end portion 74 having an annular flange portion 76 extending axially from the outer circumference of the disk portion 74. The cap piece 64 is preferably provided with one or more structures for retaining the cap piece 64 on the tubular piece 62. In the illustrated embodiment, such retaining structures are embodied as a plurality of annular internal ridges 78 that are formed in or on the flange portion 76 of the cap piece 64. Each of the illustrated internal ridges 78 extends radially inwardly from and circumferentially about the inner surface of the flange portion 76 of the cap piece 64. It will be appreciated, however, that such annular ridges 78 need not extend completely or continuously about the inner surface of the flange portion 76 of the cap piece 64. Furthermore, these or similar retaining structures 78 may be provided at any other desired location on the cap piece 64. Regardless of the specific structures thereof, the external retaining ridges 72 provided on the tubular piece 62 and the internal retaining ridges 78 provided on the flange portion 76 of the cap piece 64 are sized and shaped to cooperate with one another to selectively retain the cap piece 64 on the end of the tubular piece 62, as shown in FIG. 3.

The tubular piece 62 and the cap piece 64 may be formed from any suitable material, but are preferably formed form a material that is sufficiently strong or rigid to prevent damage from occurring to the outer cylindrical surface of the end portion 13 of the slip yoke 12 during handling, such as from impacts. For example, the tubular piece 62 and the cap piece 64 may be formed from any one of a variety of plastic materials that are relatively strong, rigid, and lightweight. Also, it is preferable that the material used to form the tubular piece 62 and the cap piece 64 be somewhat flexible to allow the cap piece 64 to be manually flexed and snapped over the end of the tubular piece 62 during installation and removal.

As discussed above, the cover assembly 60 can be used to protect the end portion 13 of the slip yoke 12. To accomplish this, the tubular piece 62 of the cover assembly 60 is initially disposed about the outer surface of the end portion 13. As also mentioned above, the tubular piece 62 is preferably retained on the end portion 13 in a frictional engagement between the reduced diameter portion 68 and the outer surface of the end portion 13 of the slip yoke 12. Thus, the tubular piece 62 protectively covers the outer surface of the end portion 13 from surface abrasions and contaminants that could potentially adversely affect the sealing relationship between such outer surface and a surrounding seal, such as the annular 11a described above, when installed in the vehicle drive train assembly 10.

As shown in FIG. 3, the cap piece 64 is then removably attached to the tubular piece 62 by virtue of the cooperating retaining structures 72 and 78 respectively provided on the tubular piece 62 and the cap piece 64. If desired, the pieces 62 and 64 of the cover assembly 60 may be formed having no such retaining structures and may, if desired, be retained together by direct frictional engagement or by one or more external retaining structures (not shown), such as threads, wires, or other fastening devices. When installed as described above, the cap piece 64 closes and protectively covers the interior of the tubular piece 62 and, thus, the internal splines 13a of the slip yoke 12. Thus, the cap piece 64 protects the internal splines 13a from contaminants that might impair the performance of the mating splined structures.

It is sometimes desirable during manufacturing and/or assembly of the drive train assembly 10 to gain access to the internal splines 13a of the slip yoke 12, while still protecting the outer surface of the end portion 13. The cover assembly 60 of this invention provides such access and protection during the assembly and transportation of the slip yoke 12 through a manufacturing facility. For example, after the slip yoke 12 has been initially formed in a manufacturing location, it is desirable to mount at least the tubular piece 62 of the cover assembly 60 over the end portion 13 thereof. The tubular piece 62 thus protects the outer surface of the end portion 13 during transportation of the slip yoke 12 to an assembly location, wherein portions of the drive train assembly 10 are assembled together. If the cap piece 64 is not mounted on the end of the tubular piece 62, then access to the splined interior of the slip yoke 12 is available. For example, a tool fixture having complimentary external splines may be used to support the slip yoke 12 during a subsequent manufacturing operation. Following that manufacturing operation, the cap piece 64 can be mounted on the end portion of the tubular piece 62 to protect the interior of the slip yoke 12.

After the slip yoke 12 has been transported to an assembly location, the tubular piece 62 of the cover assembly 60 is preferably left mounted on the end portion 13 thereof. By again removing the cap piece 64 form the tubular piece 62, the splined interior 13a of the slip yoke 12 can be subsequently accessed, such as by a tool fixture, to support the slip yoke 12 during the assembly procedures. For example, it may be desirable to use such a fixture to mount a cross on the yoke arms 14 of the slip yoke 12. After such assembly, the cap piece 64 can be re-mounted on the tubular piece 62 to again protect the interior of the slip yoke 12. The partial assembly of the drive train 10 can then be shipped to a vehicle assembly location where the drive train assembly 10 is mounted on the vehicle, such as to the engine/transmission assembly 11 and the axle assembly 38. For example, the drive train assembly 10 can be partially assembled into two portions, often referred to as "half shafts". The first half shaft includes the assembly of the first slip yoke 12, the first universal joint assembly 15, the first drive shaft section 17, and the center bearing assembly 20. The other half shaft would include the second slip yoke 25, the second universal joint assembly 30, the second driveshaft section 32, the third universal joint assembly 34, and the input shaft 37. In this example, the slip yokes 12, 25, and 35 could each be protected with a cover assembly 60. The half shafts are then shipped to the vehicle assembly location. A balancing operation may also be performed prior to transportation to the vehicle assembly location.

At the vehicle assembly location, the entire cover assembly 60 can then be manually removed with the cap piece 64 retained on the tubular piece 62. The cover assembly 60 can then be discarded or recycled for later use. The connection between the cap piece 64 and the tubular piece 62 is preferably stronger than the frictional engagement between the tubular piece 62 of the cover assembly 60 and the outer surface of the end portion 13 of the slip yoke 12 so that the cover assembly 60 can be easily removed from the slip yoke 12 by applying a force to the cap piece 64.

Figure 4:
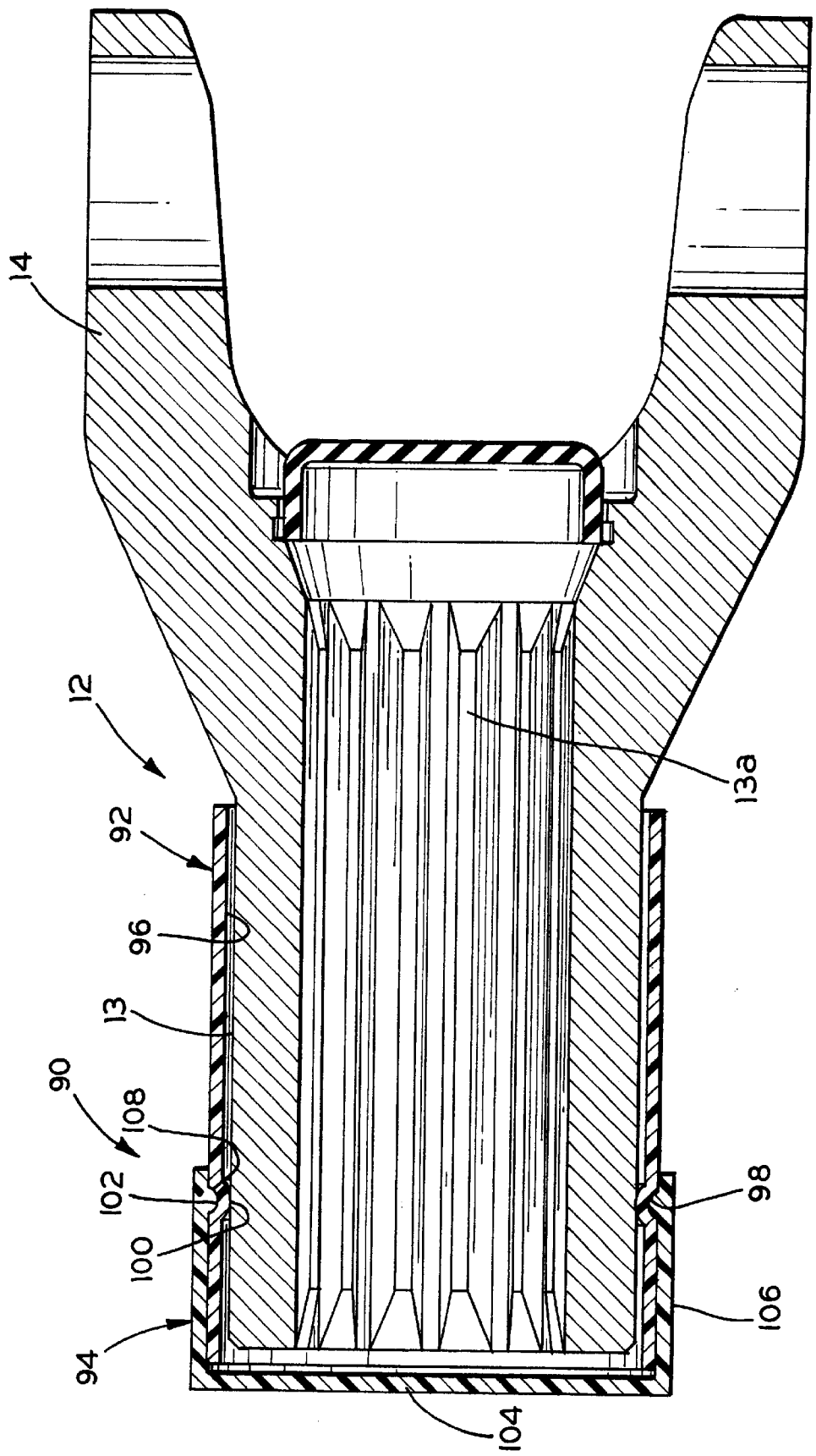
FIG. 4 is a sectional view similar to FIG. 3 of a second embodiment of a cover assembly installed on the end portion of the slip yoke in accordance with this invention.

Referring now to FIG. 4, there is illustrated a second embodiment of a cover assembly, indicated generally at 90. The cover assembly 90 is similar in structure and operation as the cover assembly 60 and includes a tubular piece, indicated generally at 92, and a cap piece, indicated generally at 94. The illustrated tubular piece 92 is generally hollow and cylindrical in shape, defining an inner surface 96. As above, the tubular piece 92 is preferably complimentary in shape to the end portion 13 of the slip yoke 12. The tubular piece 92 is preferably frictionally engaged with the outer surface of the end portion 13 of the slip yoke 12, such as by a reduced diameter portion 98. The reduced diameter portion 98 includes a radially inwardly extending surface 100 that frictionally engages the outer surface of the end portion 13 of the slip yoke 12 in the manner described above. The reduced diameter portion 98 also includes a circumferential groove 102 in the outer surface of the tubular piece 92, for a reason that will be explained below. The tubular piece 92 can be made to any suitable length, and is preferably at least as long as the outer surface of the end portion 13 of the slip yoke 12.

The cap piece 94 includes a closed end portion 104 having an annular flange portion 106 extending axially from the circumference of the closed end portion 104. The flange portion 106 of the cap piece 94 preferably has a retaining structure, such as a radially inwardly extending annular ridge 108, formed therein or provided thereon. The cap piece 94 is removably attached to the tubular piece 92 by the cooperation of the annular ridge 108 of the cap piece 94 with the groove 102 of the tubular piece 92, as shown in FIG. 4 and similar to the manner described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A slip yoke and cover assembly comprising:
   a slip yoke including a hollow end portion and a yoke portion, said hollow end portion including an outer surface and an inner splined surface, said yoke portion including a pair of arms having aligned apertures formed therethrough; and
   a cover assembly for protectively covering said hollow end portion, said cover assembly including a hollow piece adapted to fit over said hollow end portion, said hollow piece having an open end, and a cap piece removably retained on said hollow piece such that said cap piece closes said open end of said hollow piece.

2. The slip yoke and cover assembly defined in claim 1 wherein said hollow piece of said cover assembly has a reduced diameter portion provided therein that frictionally engages said hollow end portion of said slip yoke.

3. The slip yoke and cover assembly defined in claim 1 wherein said cap piece of said cover assembly has an annular flange portion that extends about a portion of said hollow piece.

4. The slip yoke and cover assembly defined in claim 1 wherein said hollow piece and said cap piece of said cover assembly have respective retaining structures provided thereon that cooperate to removably retain said cap piece on said hollow piece.

5. The slip yoke and cover assembly defined in claim 4 wherein said hollow piece retaining structure includes a ridge that extends outwardly from said hollow piece, and wherein said cap piece has an annular flange portion that extends about a portion of said hollow piece, said cap piece retaining structure including a ridge that extends inwardly from said flange portion, said hollow piece ridge cooperating with said cap piece ridge to removably retain said cap piece on said hollow piece.

6. The slip yoke and cover assembly defined in claim 4 wherein said hollow piece retaining structure includes a groove formed in an outer surface thereof, and wherein said cap piece has an annular flange portion that extends about a portion of said hollow piece, and wherein said cap piece retaining structure includes a ridge that extends inwardly from said flange portion into said groove formed in said hollow piece.

7. A combined slip yoke and cover assembly comprising:
  a slip yoke including a hollow end portion and a yoke portion, said hollow end portion including an outer surface and an inner splined surface, said yoke portion including pair of arms having aligned apertures formed therethrough; and
  a cover assembly supported on said hollow end portion of said slip yoke to protectively cover said outer surface of said hollow end portion of said slip yoke and to prevent contaminants from entering into said inner splined surface of said slip yoke, said cover assembly including a hollow piece disposed about said hollow end portion and having an open end and a cap piece removably retained on said hollow piece such that said cap piece closes said open end of said hollow piece.

8. The combined slip yoke and cover assembly defined in claim 7 wherein said hollow piece of said cover assembly frictionally engages said outer surface of said hollow end portion of said slip yoke.

9. The combined slip yoke and cover assembly defined in claim 7 wherein said hollow piece of said cover assembly has a reduced diameter portion formed therein that frictionally engages said outer surface of said hollow end portion of said slip yoke.

10. The combined slip yoke and cover assembly defined in claim 7 wherein said cap piece of said cover assembly frictionally engages said hollow piece of said cover assembly.

11. The combined slip yoke and cover assembly defined in claim 7 wherein said hollow piece of said cover assembly has a retaining structure provided therein for removably retaining said cap piece of said cover assembly on said hollow piece of said cover assembly.

12. The combined slip yoke and cover assembly defined in claim 11 wherein said hollow piece retaining structure is a plurality of ridges.

13. The combined slip yoke and cover assembly defined in claim 11 wherein said hollow piece retaining structure is a groove.

14. The combined slip yoke and cover assembly defined in claim 13 wherein said groove is defined by a reduced diameter portion formed in said hollow piece of said cover assembly therein that frictionally engages said outer surface of said hollow end portion of said slip yoke.

15. The combined slip yoke and cover assembly defined in claim 7 wherein said cap piece of said cover assembly has a retaining structure provided therein for removably retaining said cap piece of said cover assembly on said hollow piece of said cover assembly.

16. The combined slip yoke and cover assembly defined in claim 15 wherein said hollow piece retaining structure is a plurality of ridges.

17. The combined slip yoke and cover assembly defined in claim 7 wherein said hollow piece of said cover assembly and said cap piece of said cover assembly have cooperating retaining structures respectively provided therein for removably retaining said cap piece of said cover assembly on said hollow piece of said cover assembly.

18. The combined slip yoke and cover assembly defined in claim 17 wherein said hollow piece retaining structure is a plurality of ridges and wherein said cap piece retaining structure is a plurality of ridges.

19. The combined slip yoke and cover assembly defined in claim 17 wherein said hollow piece retaining structure is a groove and said cap piece retaining structure is a ridge that extends into said groove.

20. The combined slip yoke and cover assembly defined in claim 19 wherein said groove is defined by a reduced diameter portion formed in said hollow piece of said cover assembly therein that frictionally engages said outer surface of said hollow end portion of said slip yoke.

* * * * *